United States Patent [19]
Rough

[11] 3,850,606
[45] Nov. 26, 1974

[54] METHOD FOR MELTING GLASS-MAKING MATERIALS

[75] Inventor: Robert R. Rough, Toledo, Ohio

[73] Assignee: Owens-Illinois, Inc., Toledo, Ohio

[22] Filed: July 2, 1973

[21] Appl. No.: 375,532

[52] U.S. Cl............................ 65/178, 13/6, 65/134
[51] Int. Cl............................................. C03b 5/18
[58] Field of Search............. 65/178, 134, 179; 13/6

[56] References Cited
UNITED STATES PATENTS

| | | | |
|---|---|---|---|
| 1,267,317 | 5/1918 | Erskine | 13/6 |
| 1,898,039 | 2/1933 | Eckert | 65/178 X |
| 2,238,800 | 4/1941 | Mueller | 65/178 X |
| 2,859,261 | 11/1958 | Arbeit | 65/178 X |
| 3,244,493 | 4/1966 | Cala | 65/179 X |
| 3,358,066 | 12/1967 | Tiede et al. | 65/178 X |
| 3,539,691 | 11/1970 | Lucek | 13/6 |

Primary Examiner—Robert L. Lindsay, Jr.
Assistant Examiner—Kenneth M. Schor
Attorney, Agent, or Firm—E. F. Dwyer; E. J. Holler

[57] ABSTRACT

A method and apparatus for rapidly melting glass-making materials wherein the glass-making materials are introduced into a chamber containing molten glass, heat is applied to the materials in the chamber by passage of an electric current between spaced electrodes while one of the electrodes is moved within the molten materials to agitate the materials to constantly move the location of the heating point through the batch glass-making materials and to enfold newly-added glass-making materials into the molten glass within the chamber. The moving electrode moves in a generally circular path so that a portion of its path moves it out of and back into the molten glass.

3 Claims, 5 Drawing Figures

3,850,606

METHOD FOR MELTING GLASS-MAKING MATERIALS

This invention relates to a method and apparatus for rapidly melting glass-forming materials.

BACKGROUND OF THE INVENTION

In conventional methods and apparatus for melting, glass is made by introducing glass-forming materials into an apparatus known as a furnace or tank which is likely to hold about 300 tons of molten glass, quantities of heat are added to the glass to bring the glass-forming materials to a molten state; additional batch material is fed onto the surface of already molten glass within the furnace, where it floats on the top of the molten glass; and the batch material is gradually melted into the molten mass of glass in the furnace. Physical action and chemical reactions during the heating of the molten mass of glass in the furnace lead to the generation of "gaseous inclusions". These gaseous inclusions are then removed from the molten glass mass by continued heating of the mass in the refining portion of the furnace for periods ranging from 24 to 36 hours. The rate of processing of glass in a prior art furnace is very slow, due to the time required to remove the gaseous inclusions formed during the melting process.

In the copending U.S. application Ser. No. 130,672, filed Apr. 12, 1971 now U.S. Pat. No. 3,754,886, having a common assignee with the present application, there is disclosed and claimed a method and apparatus for refining molten glass having gaseous inclusions therein by rotating the mass of glass in a chamber to form a paraboloidal void and thereby cause pressure gradients in the glass to force the gaseous inclusions out of the glass. Such method and apparatus permit the unrefined molten glass that is introduced into the chamber to contain a higher number of gaseous inclusions that has heretofore been possible to the extent that the unrefined molten glass delivered to the chamber may be foamy melted glass.

Among the objects of this invention are to provide a method and apparatus for rapidly melting glass-making materials utilizing reduced volumetric areas of the melting chamber, utilizing a lower melting temperature than required by the prior art methods and apparatus to produce a foamy molten glass which can thereafter be further refined to remove the gaseous inclusions.

SUMMARY OF THE INVENTION

In accordance with the invention, glass-making materials are introduced into a chamber and brought to a molten state; additional materials are introduced into the molten glass within the chamber; heat is supplied to the molten glass by passing an electric current between at least one stationary electrode and one moving electrode to constantly change the location of the heating point to enfold the added unmelted materials and distributes them through the molten glass, and to locate heat at a point where the cold glass-making materials are being added.

DESCRIPTION

Figure 1:
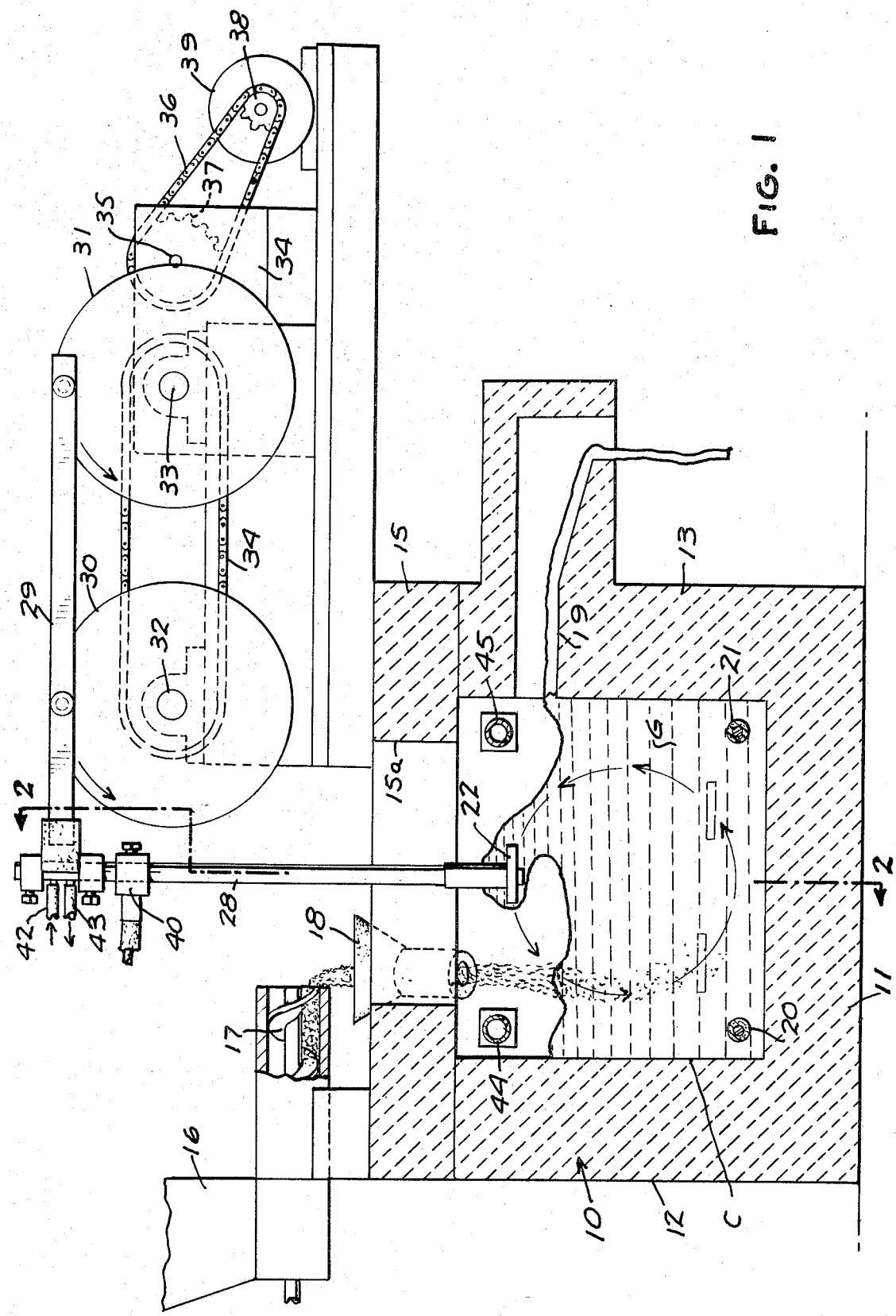
FIG. 1 is a longitudinal part sectional view of an apparatus embodying the invention.
Figure 2:
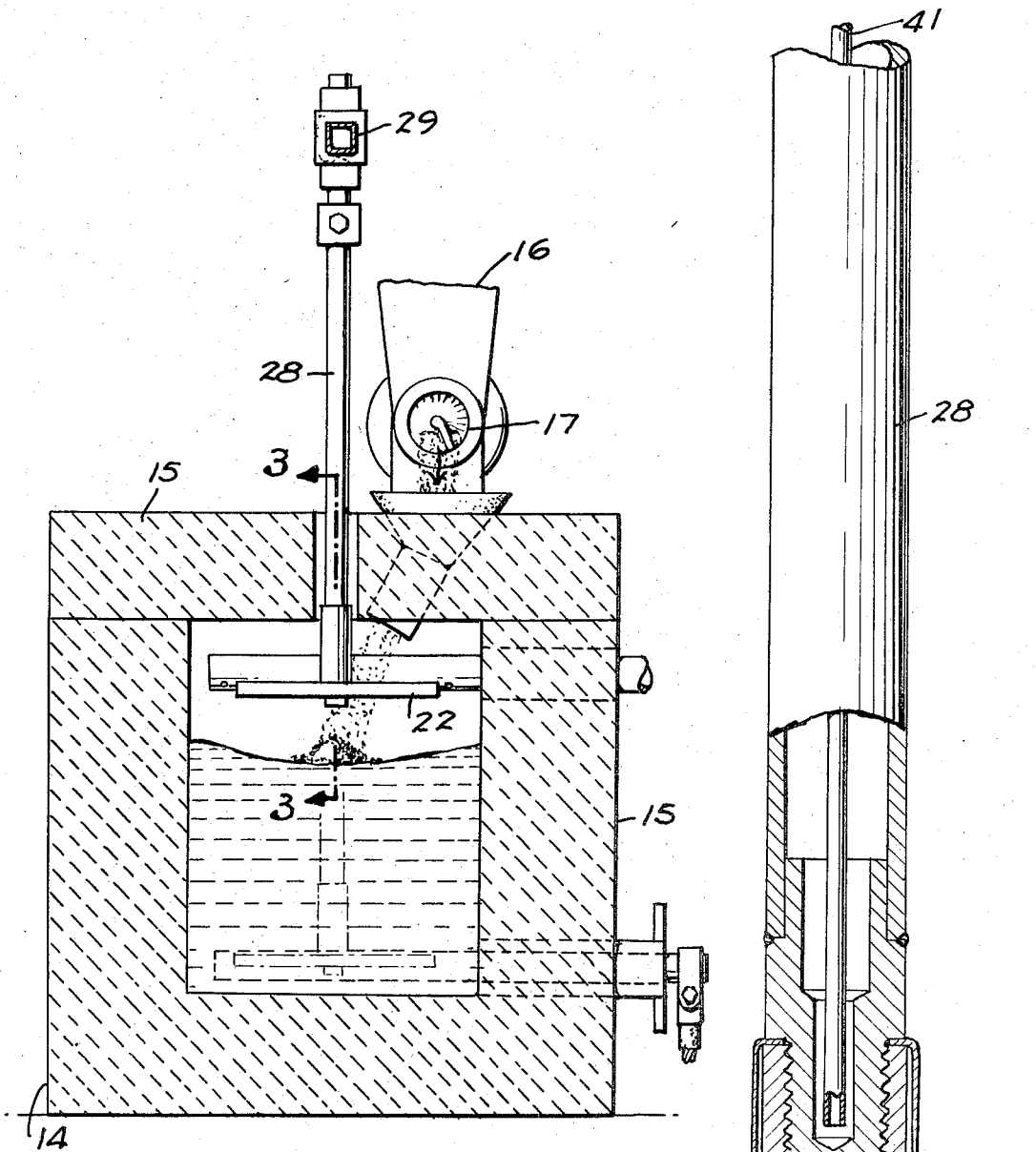
FIG. 2 is a fragmentary sectional view taken along the line 2—2 in FIG. 1.
Figure 3:
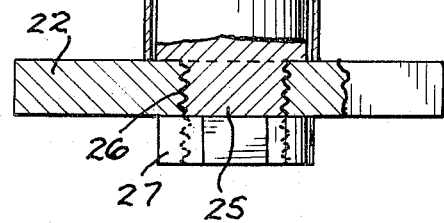
FIG. 3 is a fragmentary sectional view on an enlarged scale taken along the line 3—3 in FIG. 2.

Referring to FIGS. 1 and 2, the apparatus embodying the invention comprises a furnace 10 made of suitable refractory materials and comprising a bottom 11, end walls 12, 13, side walls 14 and a top wall 15 which define a chamber C.

Means are provided adjacent one end of the furnace 10 for supplying glass-making materials such as granular glass-making materials and comprises a hopper 16 from which the materials are removed by a screw 17 and delivered to a funnel 18 so that they are deposited onto the surface of the body of molten glass G as presently described. End wall 13 includes an outlet 19 through which the glass is permitted to pass out of the furnace. Stationary electrodes 20, 21 extend through the wall 15 horizontally into the molten glass G adjacent the bottom of the chamber C defined by the furnace and are connected to a source of power of the same polarity.

A stirrer 22 in the form of a flat blade is mounted for orbital circular movement in a vertical plane into and out of the molten glass G by an arrangement which includes a shaft 23. Stirrer blade 22 is preferably rectangular in plan view and of generally uniform thickness. The shaft 23 has a lower section 24 with a threaded portion 25 that extends through an opening 26 in the blade 22 and a nut 27 is threaded thereon to hold the stirrer blade 22 in position. Shaft 23 includes a hollow upper section 28 that extends up through an opening 15a in the top wall 15 and onto which the lower section 24 is threaded. The upper section 28 is clamped to a horizontal rod 29 that is pivoted at spaced points to wheels 30, 31 mounted on shaft 32, 33. The shafts 32, 33 are rotated in synchronism by an interconnection formed by a chain 34 trained over sprockets on the shafts. Shaft 33 is in turn driven by a gear box 34 which has an input shaft 35 driven through a chain 36 and sprockets 37, 38, by a motor 39. When the motor 39 is rotated, the shaft 23 is moved through a vertical circular orbital path that at the same time the shaft 23 is maintained vertical.

Proper cooling is provided to the shaft by cooling the upper section 28 which is hollow, through a tube 41 positioned in the upper section providing liquid coolant such as water to the interior of the section 28. Water is introduced through an inlet tube 42 to the tube 41 and removed from the space surrounding the tube 41 through an outlet tube 43.

An electrode connection is made to the shaft 23 as at 40. The electrical connection 40 to the shaft 28 and in turn the stirrer plate 22 is of opposite polarity to the polarity of the electrodes 20, 21 so that when the stirrer plate 22 is in the molten glass G, an electrical potential is applied so the current will pass between the electrodes 20 and 22 and 21 and 22 as the electrode 22 passes the respective electrodes 20, 21.

The path of movement of the stirrer plate 22 is such that the stirrer is moved in a counterclockwise direction as viewed in FIG. 1 and through a portion of its path moves out of the molten glass and back into the molten glass. The stirrer functions to contact the unmelted glass-making materials on the surface of the molten glass and move them downwardly enfolding them into molten glass, thus facilitating melting.

In order to provide for start up of the furnace and initially provide the molten glass through which electrical current can be passed, burners 44, 45 are provided in the upper end of chamber C.

When a batch of material is brought to a molten state, it then becomes electrically-conductive. The circular movement of electrode 22 in an endless path causes the incipient point of heating which occurs about the electrode to be continuously moved through the mass of materials in chamber 10.

Sufficient heat and simultaneous agitation are applied to the molten glass so that glass removed from the chamber is a foamy glass comprising substantially completely molten material with entrapped gases therein.

The relationship existing between the radius of the path of travel of the stirrer and the volumetric area of the chamber insures that a maximum amount of glass in the chamber is subjected to the homogenizing effect of stirring. The small volume chamber is an asset in that it reduces construction costs; reduces space requirements and most important, reduces the amount of total heat (including wasted heat) measured in BTUs required to melt any pre-determined volume of glass batch measured by weight compared with the prior art melting method. Heat is concentrated in a small volume area, producing a maximum melting effect per BTU supplied. The stirring device extends across about the dimension of the chamber, within a few inches of the chamber walls, and subjects substantially the entire volume of the glass to both batch enfolding action, homogenizing activity, and the Joule heating effect. Glass-forming batch materials are enfolded, dispersed and heated, all rapidly, to a molten condition to produce a foamy molten glass having gaseous inclusions.

This invention thus provides a method for rapidly mixing and melting batches of glass-forming materials, producing molten glass which can then be refined. The molten glass is a starting material for subsequent manufacturing into articles of glass. This foamy molten glass may then be refined in several ways, including additional heating, or by a method disclosed and claimed in copending application Ser. No. 130,672, filed Apr. 2, 1971, Richards et al., and having a common assignee with the present application.

In a typical installation which has produced satisfactory results, the volumetric size of the chamber is approximately 2 feet long by 1½ feet high. The circular path of the stirring device travels through a circle of about one foot diameter. The stirrer was moved through its orbit about 50 times per minute.

In the practice of this invention, glass-forming materials were introduced into the chamber through the glass-batch entrance and are brought to a molten temperature by gas heat. 100 KW of electric power was applied. Gaseous fuel was burned to assist in keeping the crown hot. Additional glass-batch materials were then added to the surface of the molten glass, and the moving electrode enfolded the added batch into the existing molten glass.

In a conventional glass tank, the temperature at the top of the tank approaches 2,700°F. to insure that the batch material at the bottom of the tank is at least near 2,000°F. The addition of cold batch to the warm molten glass produces cold spots and results in a zone of stiff glass. As the additional batch material is added, the glass temperature drops rapidly to about 2,300°F. However, in this invention, the movement of the stirring device 22 enfolds the fresh batch and disperses it throughout the molten batch; and the presence of the cold batch presents a path of higher electrical resistance to the current, hence the Joule heating effect, caused by the passage of a current between the stirring device and the electrodes develops maximum heat in the cold batch because of its high electrical resistivity providing efficient mixing and rapid heating of the batch materials.

The process, as described herein, melted a mixture of standard soda-lime-silica glass batch materials at rates as high as four tons of molten glass per 24-hour day.

Thus, the heating efficiency is exceptionally high because of the small dimensions of the chamber, and permits an almost uniform stirring throughout the glass contained in the chamber. This method melts raw glass-making material into molten glass at very high rates and at a lower temperature than prior art furnace methods. The electrode moves in a path, preferably endless and circular, and serves to enfold batch material into the molten glass and thoroughly disperse batch throughout the molten glass, while heating the batch material.

The movement of the stirrer is designed to draw newly added batch rapidly under the surface of the existing molten glass and reduce the detrimental chilling effect the cold batch has on the existing molten glass. The moving electrode being part of the electrical paths has the effect of producing the most heat in the cooler glass at the point of contact between the electrode and newly added batch — where the added heat confers the most benefit, resulting in improved temperature uniformity throughout the chamber. The heating effect of the stirring electrode eliminates the problem of excessive temperatures produced at points in the melt, which temperatures erode and destroy the lining of the mixing and melting chambers.

Figure 4:
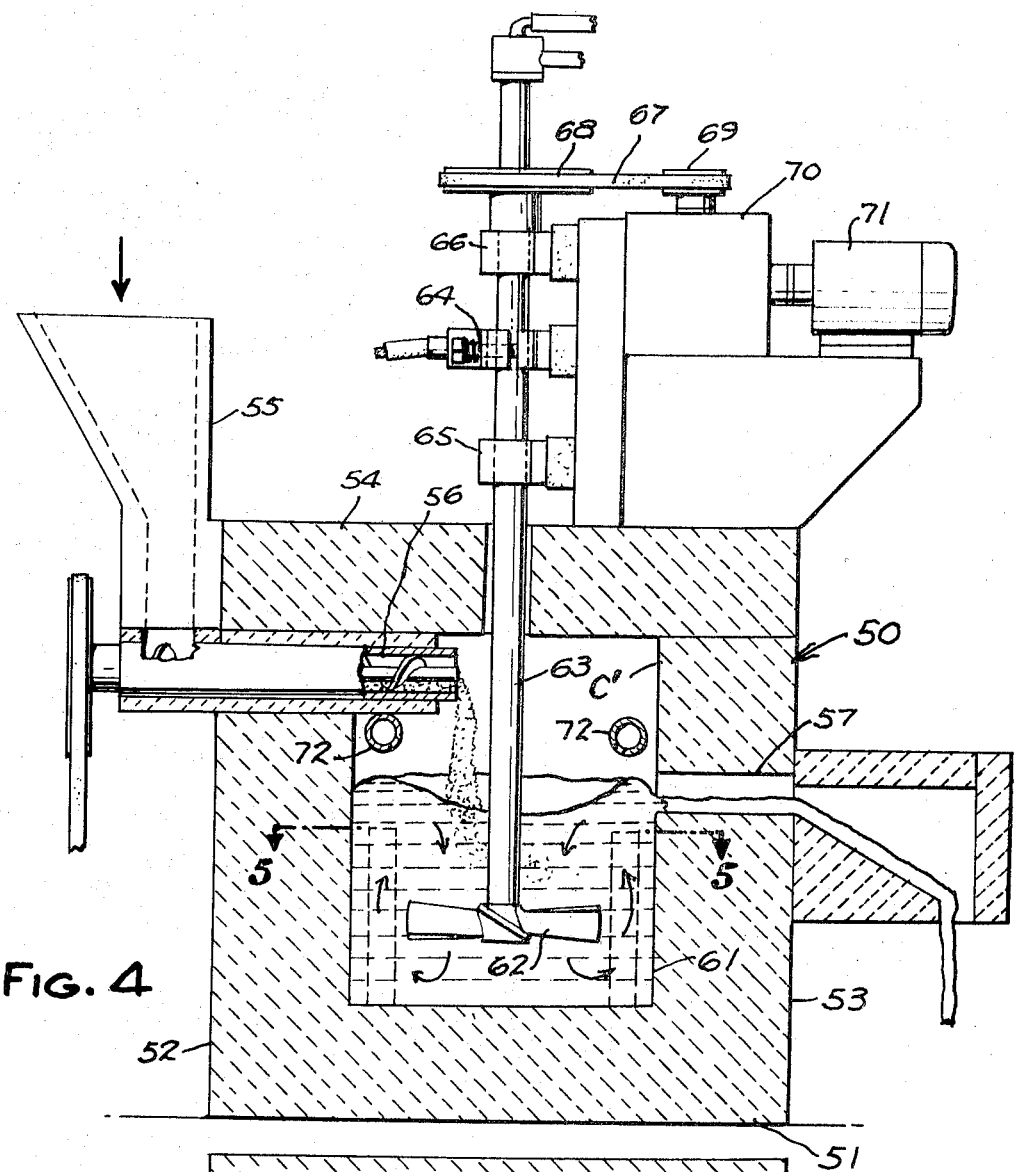
FIG. 4 is a longitudinal part sectional view of a modified form of the apparatus.

In the form of the invention shown in FIG. 4, the furnace 50 includes a bottom wall 51, end walls 52, 53 and a top wall 54 defining a square chamber C'.

As in the previous form of the invention, glass-forming materials are delivered from a hopper 55 by a screw 56 to the chamber C' and the molten glass is removed through an outlet 57 at the opposite end of the generally rectangular chamber.

In this form of the invention, the stationary electrodes 58, 59, 60, 61 are provided at the corners of the chamber and extend vertically and the stirrer 62 comprises a propeller mounted on the lower end of a shaft 63 which may be water cooled as in the previous form of the invention and to which an electrical connection is made as at 64. The shaft is mounted in spaced bearings 65, 66 and rotated by a drive belt 67 and pulleys 68, 69 through a gear box 70 driven by a motor 71. Burners 72 are provided for start-up as in the previous form of the invention.

When the stirrer 62 is rotated, about the vertical axis, the upper surface of the molten glass G' takes on a configuration such as shown in FIG. 4 defining a rather concave surface or vortex. The glass-making materials are introduced into this vortex and rotation of the stirrer 62 causes a circulation in the molten glass in the general direction of the arrow in substantially vertical orbital paths downwardly adjacent the shaft 63 and then upwardly adjacent the inner surface of the walls of the chamber C'. This causes an enfolding or mixing of the glass-making materials into the molten glass G' facilitating melting. Further, the connection of the stirrer 62 to a power source of opposite polarity from that to which the electrodes 58-61 are connected, causes current to pass at least periodically between the tips of the propeller blades and the respective stationary electrodes, as the tips pass near the stationary electrodes, further heating and thereby melting glass-forming materials.

Figure 5:
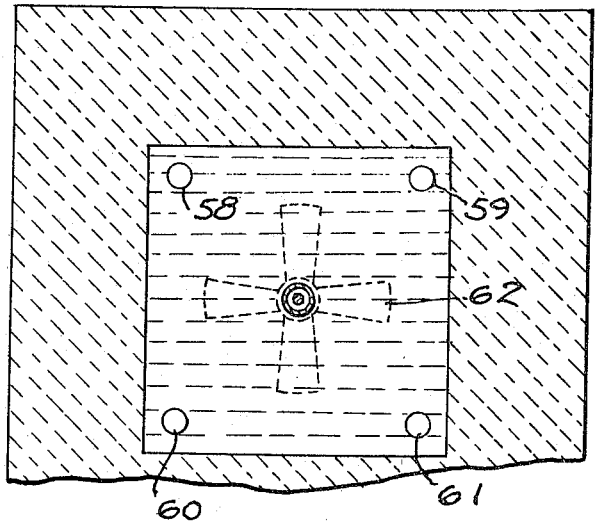
FIG. 5 is a fragmentary sectional view taken along the line 5—5 in FIG. 4.

In a typical installation of the type shown in FIGS. 4 and 5, the chamber C' was 2 feet square, the stirrer had 4 blades, a diameter of 18 inches and was rotated at 200 r.p.m. With 150 KW of power, it was found that the melting capacity was 12 tons per 24 hour day.

In each of the forms of the invention, the movable electrode stirrer subjects both the molten glass and glass-making materials in the chamber to agitation. As additional glass-making materials are deposited onto the surface of the existing molten glass pool, they are quickly enfolded into the molten glass, and this additional raw material is also thoroughly agitated. The movable electrode stirrer produces a rapid and uniform dispersion of the added glass-making materials and molten glass. The simultaneous passage of an electric current through the molten glass between the movable electrode stirrer and the stationary electrodes, produces a Joule heating effect and generates heat within the molten material. The simultaneous agitation with its high rate of shear and the rapid transfer of heat to small volumes of both molten glass and unmelted glassmaking materials, facilitates melting the glass and promotes rapid chemical reactions. Glass leaving the furnace is a foamy molten glass including a high number of gaseous inclusions. Depending on the residence time the glass may contain some undissolved sand grains, incompleted chemical reactions, and cords, resulting from inhomogeneity of the molten glass which can be eliminated by heat and moderate shear prior to the final refining to remove the gaseous inclusions.

I claim:

1. A method of melting glassmaking materials to form a homogeneous molten glass having gaseous inclusions comprising the steps of:

applying heat to glass forming materials to produce a mass of molten glass;

adding glassmaking batch material to the molten glass;

applying additional heat to the molten glass by passing an electric current between at least one stationary electrode and a moving electrode to constantly change the location of the electric heating point to mix the added unmelted glassmaking material and distribute them rapidly through the molten glass so as to locate heat at the point of addition of the glassmaking materials;

continuing to move the electrode so as to draw the newly added batch rapidly under the surface of the existing molten glass and to agitate both the molten glass and added glassmaking materials wherein said moving electrode is moved in a generally circular path so that a portion of its path moves out of the molten glass, and back into the molten glass; and contacting the unmelted glassmaking materials added to the surface of the batch and moving them rapidly downward, mixing them into said molten glass thereby rapidly melting the unmelted glass materials.

2. The process of claim 1 wherein the movable electrode extends about the dimension of the mass of molten glass being heated to subject almost the volume of glass to homogenization activity and Joule heating effect.

3. The process of claim 1 wherein the process is conducted in a volumetric size of about 2 feet by 2 feet by 1½ feet in depth, the movable electrode outlining the glass mass about 50 times per minute.

* * * * *